United States Patent
Holsen et al.

(10) Patent No.: US 8,266,071 B2
(45) Date of Patent: *Sep. 11, 2012

(54) MANIFEST GENERATION AND DOWNLOAD SYSTEMS AND METHODS

(75) Inventors: Jim Holsen, Marietta, GA (US); Duane Anderson, Cockeysville, MD (US); Juan Perez, Richardson, TX (US); Mark Davidson, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/007,036

(22) Filed: Jan. 14, 2011

(65) Prior Publication Data

US 2011/0112979 A1    May 12, 2011

Related U.S. Application Data

(63) Continuation of application No. 10/745,468, filed on Dec. 22, 2003, now Pat. No. 7,895,132.

(51) Int. Cl.
   G06Q 30/00 (2012.01)
   G06Q 10/00 (2012.01)
   G08G 1/00 (2006.01)
   G08G 1/123 (2006.01)
   G01C 21/00 (2006.01)
   G01C 1/00 (2006.01)

(52) U.S. Cl. ........ 705/338; 705/1.1; 705/7.11; 705/330; 340/904; 340/988; 340/994; 701/200; 701/207; 701/208; 701/212

(58) Field of Classification Search ............... 705/1.1, 705/7.11–7.42; 701/204–210; 340/904, 340/988–994
See application file for complete search history.

(56) References Cited

U.S. PATENT DOCUMENTS

| | | |
|---|---|---|
| 5,804,802 A | 9/1998 | Card et al. |
| 5,897,629 A | 4/1999 | Shinagawa et al. |
| 6,363,323 B1 | 3/2002 | Jones |
| 6,401,078 B1 | 6/2002 | Roberts et al. |
| 6,510,383 B1 | 1/2003 | Jones |
| 6,753,830 B2 | 6/2004 | Gelbman |
| 6,924,781 B1 | 8/2005 | Gelbman |
| 6,975,998 B1 | 12/2005 | Jones |
| 7,187,278 B2 | 3/2007 | Biffar |
| 2002/0032594 A1 | 3/2002 | Fukuda |
| 2002/0044084 A1 | 4/2002 | Itoh et al. |

(Continued)

FOREIGN PATENT DOCUMENTS

JP    2001014585 A    1/2001

OTHER PUBLICATIONS

Gooley, Toby B., "When There's No Time To Waste . . . " Jun. 1997, Logistics Management, pp. 35-37.

*Primary Examiner* — Fadey Jabr
(74) *Attorney, Agent, or Firm* — Alston & Bird LLP

(57) ABSTRACT

The present invention is directed to systems and methods to generate a manifest of work that is to be performed by a driver. Specifically, systems and methods are described in the context of a package delivery system to generate a manifest of deliveries and pickups to be performed by a driver and to download the generated manifest to a portable computing device used by the driver to service the route.

25 Claims, 8 Drawing Sheets

U.S. PATENT DOCUMENTS

| | | |
|---|---|---|
| 2003/0101069 A1 | 5/2003 | Sando |
| 2003/0130964 A1 | 7/2003 | Hudson |
| 2003/0198337 A1 | 10/2003 | Lenard |
| 2003/0220806 A1 | 11/2003 | Hoffman et al. |
| 2004/0004119 A1 | 1/2004 | Baldassari et al. |
| 2004/0030572 A1 | 2/2004 | Campbell et al. |
| 2004/0073472 A1 | 4/2004 | Sakuma et al. |
| 2004/0243430 A1 | 12/2004 | Horstemeyer |
| 2005/0038758 A1 | 2/2005 | Hilbush et al. |
| 2005/0251330 A1 | 11/2005 | Waterhouse et al. |
| 2007/0083410 A1 | 4/2007 | Hanna |
| 2007/0102329 A1 | 5/2007 | Rosenbaum et al. |
| 2008/0086393 A1 | 4/2008 | Naghshineh et al. |

|  |  |  |  |  |  |  |  |  |  |  |  |
|---|---|---|---|---|---|---|---|---|---|---|---|
| 3000 | 4000 | 2000 | 1000 | 3000 | 4000 | 2000 | 1000 | 3000 | 4000 | 2000 | 1000 |
| 3999 | 4999 | 2999 | 1999 | 3999 | 4999 | 2999 | 1999 | 3999 | 4999 | 2999 | 1999 |
| 7000 | 8000 | 6000 | 5000 | 7000 | 8000 | 6000 | 5000 | 7000 | 8000 | 6000 | 5000 |
| 7999 | 8999 | 6999 | 5999 | 7999 | 8999 | 6999 | 5999 | 7999 | 8999 | 6999 | 5999 |
| R019 | | | | R020 | | | | R021 | | | |

```
Pri:Blue     Sec:Yellow     Lrg:A22     10:30

R021-5889
The Joseph                              SLIC: 1234 LP: 12A
1228 Main Street                        RTE: POLITO, R
Suite 55                                12/28/1999 05:59
Floor 2                                 DCAP:A01
Townsintheusofamerica, MD 21300-1234    PRT:001
[Consment Field]                 EOF]   1Z34567890123456 78
```

Fig. 2

```
COUNTRY LN
HARTSVILLE SC 29550

P: DARYL    S: 0069    I: OUT
45E-6630              [D]
1Z123456789012 3454
800 HIP PRINTER   Feb 22 08:15:02  2002
US 2950  HIP   1.10   ELT2543
```

```
COUNTRY LN
MC SC  29101

P:          S:           I:
45E-6630              [ ]
1Z123456789012 3454
800 HIP PRINTER   Feb 22 08:14:27  2002
US 2950  HIP   1.10   ELT2543
```

Fig. 8

MANIFEST GENERATION AND DOWNLOAD SYSTEMS AND METHODS

CROSS-REFERENCE TO RELATED APPLICATIONS

This application is a continuation of U.S. patent application Ser. No. 10/745,468 filed Dec. 22, 2003 now U.S. Pat. No. 7,895,132, which is hereby incorporated herein in its entirety by reference.

FIELD OF THE INVENTION

The present invention relates to systems and methods to generate and transmit a manifest of work to a portable computing device that is carried and used by a driver in his or her route.

BACKGROUND OF THE INVENTION

A logistics challenge in the package delivery industry and in other industries that dispatch drivers to a variety of locations to perform work and/or otherwise service customers is the ability to present a driver with a complete picture of the work to be completed on a given day. Companies with fleets of vehicles spend vast amounts of time and money to develop dispatch plans and driver routes to allow a driver to efficiently cover as much territory in as little time as possible. Unfortunately, the dispatch plan and route that a driver typically uses to service a territory is based not on the actual work assigned to the driver, but on statistical analysis of the work that is typically assigned to a driver on an average day.

The driver's route, then, is not based on his or her work assignments, but on forecasts of what type of workload the driver will typically receive on a given day. This reliance on forecasts and statistical averaging of historical data has a number of shortcomings. One problem is that the driver rarely knows what work he or she has actually been assigned until just before the route begins. In most cases, the distribution of work between a group of drivers is an ongoing process that continues until just before the drivers leave a hub facility and begin servicing their routes. This time crunch at the start of the day often results in drivers beginning their routes with an incomplete picture of the work assigned to them.

In the package delivery context, drivers are only minimally involved as packages are loaded into delivery vehicles. Loading responsibility generally falls to a group known as pre-loaders who have the responsibility of receiving packages from sortation belts and bins and of loading the packages onto one of a line of delivery vehicles. Because of the number of packages and the time required to load a delivery vehicle, the pre-load process typically starts between 4:00 a.m. and 5:00 a.m. and is nearing completion by the time the driver arrives at the facility. Although some discussion may occur between the drivers and the pre-loaders, the pre-loaders deal with such a large number of packages that they cannot recall specifics about packages loaded onto a particular delivery vehicle.

As a result, if a driver wants to know what or how much work has been assigned to his route, he or she must physically examine and sort through the packages loaded in the storage area of the vehicle. And if a package is loaded in the wrong area or if the driver simply misses a package during this inventory process, a package may go unnoticed until well after the driver has passed the point in the route where the package should have been delivered. This forces the driver to break from the planned route to deliver the package that was missed resulting in inefficiencies in the delivery process.

Another complicating factor in delivery processes that are used today is the existence of premium service levels and delivery time guarantees. Almost every commercial package carrier now offers some form of premium service level that comes with a guarantee that a package will be delivered by a certain time of day or within a specified time window. These delivery time guarantees complicate the driver's job by requiring that during the inventory of his or her work assignments for the day, the driver must recognize the work assigned that was assigned to the route and the packages that have been guaranteed to be delivered by a certain time. Not surprisingly, drivers sometimes fail to identify a package as having a commit time until after the guaranteed time of delivery has passed. In other cases, drivers lose track of time and have to break from their planned route to satisfy a commit time.

A unsatisfied need therefore exists in the industry for improved systems and methods of providing drivers with work manifests.

SUMMARY OF THE INVENTION

The present invention is directed to systems and methods to generate a manifest of work that is to be performed by a driver. Specifically, systems and methods are described in the context of a package delivery system to generate a manifest of deliveries and pickups to be performed by a driver and to download the generated manifest to a portable computing device used by the driver to service the route.

In one embodiment of the present invention, a system for generating a manifest of work in a package delivery system is described that includes a data capture system that captures shipping label data for packages that are bound to a designated geographic location; a work allocation system that assigns each of the packages to one of many preexisting delivery routes from the shipping label data; a manifest generation application that monitors the assignment of packages and generates a manifest of work for each delivery route; and a portable computing device that receives electronically the manifest of work.

In another embodiment of the present invention, a system for generating a manifest of work in a package delivery system is described that includes a data capture system that captures a service level and destination address for packages that are delivered within a given geographic location; a work allocation system that assigns each of the packages to one of many preexisting delivery routes based on the destination address and service level; a manifest generation application that monitors the assignment of packages and generates a manifest of work for each delivery route; and a portable computing device that receives electronically the manifest of work.

In another embodiment of the present invention, a system for generating a manifest of work in a package delivery system is described that includes a data capture system that captures a service level and destination address for packages that are delivered within a given geographic location; a work allocation system that assigns each of the packages to one of many preexisting delivery routes by comparing the destination address and service level against a dispatch plan; a manifest generation application that monitors the assignment of packages and generates a manifest of work for each delivery route; and a portable computing device that receives electronically the manifest of work.

In another embodiment of the present invention, a system for generating a manifest of work in a package delivery system is described that includes a data capture system that captures a service level and destination address for packages that are delivered within a given geographic location; a work allocation system that assigns each of the packages to one of many preexisting delivery routes by comparing the destination address and service level against a dispatch plan; a manifest generation application that monitors the assignment of packages and generates a manifest of work, in the form of a list of locations and sequence of serving those locations, for each delivery route; and a portable computing device that receives electronically the manifest of work and displays the work to be performed in accordance with the sequence set out in the manifest.

In another embodiment of the present invention, a package delivery system is described that generates a manifest for each of a plurality of preexisting routes and downloads the manifests to a plurality of portable computing devices. As described herein, the package delivery system includes a data capture system that captures shipping label data from a plurality of packages; a work allocation system that assigns each of the plurality of packages to one of the preexisting routes based at least in part on the shipping label data; a manifest generation application that generates the manifest for each of the plurality of preexisting delivery routes, wherein the manifest includes a list of packages that have been assigned to one of the preexisting delivery routes; and a route manager that downloads the manifest to the portable computing device associated with the one of the preexisting delivery routes.

In another embodiment of the present invention, a package delivery system is described that generates a manifest for each of a plurality of preexisting routes and downloads the manifests to a plurality of portable computing devices. As described herein, the package delivery system includes a data capture system that captures shipping label data, in the form of a destination address for the package and an associated target delivery time, from a plurality of packages; a work allocation system that assigns each of the plurality of packages to one of the preexisting routes based at least in part on the package destination address and target delivery time; a manifest generation application that generates the manifest for each of the plurality of preexisting delivery routes, wherein the manifest includes a list of packages that have been assigned to one of the preexisting delivery routes; and a route manager that downloads the manifest to the portable computing device associated with the one of the preexisting delivery routes.

In another embodiment of the present invention, a system for generating a manifest that lists one or more units of work that are scheduled to be completed on a preexisting route for a given day is described that includes a data capture system that identifies locations where the one or more units of work are to be completed; a work allocation system that assigns each of the units of work to one of a plurality of preexisting routes based at least in part on the identified locations; a manifest generation application that monitors the assignment of the units of work and generates the manifest for each of the plurality of preexisting routes; and a portable computing device associated with one or more of the plurality of preexisting routes that receives the manifest in an electronic format.

In another embodiment of the present invention, a system for generating a manifest that lists one or more units of work that are scheduled to be completed on a preexisting route for a given day is described that includes a data capture system that identifies locations where the one or more units of work are to be completed; a work allocation system that assigns each of the units of work to one of a plurality of preexisting routes based at least in part on the identified locations; a manifest generation application that monitors the assignment of the units of work and generates the manifest for each of the plurality of preexisting routes; a portable computing device associated with one or more of the plurality of preexisting routes that receives the manifest in an electronic format; and a route manager that controls a download of the manifest to the portable computing device.

In another embodiment of the present invention, a system for generating a manifest that lists one or more units of work that are scheduled to be completed on a preexisting route for a given day is described that includes a data capture system that identifies locations where the one or more units of work are to be completed; a work allocation system that assigns each of the units of work to one of a plurality of preexisting routes based at least in part on the identified locations; a manifest generation application that monitors the assignment of the units of work and generates the manifest for each of the plurality of preexisting routes; and a portable computing device associated with one or more of the plurality of preexisting routes that receives the manifest in an electronic format via wireless transmission.

In another embodiment of the present invention, a system for generating a manifest that lists one or more units of work that are scheduled to be completed on a preexisting route for a given day is described that includes a data capture system that identifies locations where the one or more units of work are to be completed; a work allocation system that assigns each of the units of work to one of a plurality of preexisting routes based at least in part on the identified locations; a manifest generation application that monitors the assignment of the units of work and generates the manifest for each of the plurality of preexisting routes; and a portable computing device associated with one or more of the plurality of preexisting routes that receives the manifest in an electronic format; and wherein the portable computing device is configured to display the manifest to the driver in a sequence that the units of work are to be completed in accordance with the preexisting route.

In another embodiment of the present invention, a system for generating a manifest that lists one or more units of work that are scheduled to be completed on a preexisting route for a given day is described that includes a data capture system that identifies locations where the one or more units of work are to be completed; a work allocation system that assigns each of the units of work to one of a plurality of preexisting routes based at least in part on the identified locations; a manifest generation application that monitors the assignment of the units of work and generates the manifest for each of the plurality of preexisting routes; a portable computing device associated with one or more of the plurality of preexisting routes that receives the manifest in an electronic format; wherein the portable computing device includes a microprocessor, a memory, a display, an input device, an I/O interface and a clock.

In another embodiment of the present invention, a system for generating a manifest that lists units of work that are to be completed on one of a plurality of preexisting routes, wherein each of the preexisting routes lists a plurality locations in a geographic area and a predetermined order to be used to service the locations, is described and includes: a data capture system that identifies a plurality of locations where the units of work are to be completed; a work allocation system that assigns each of the units of work to one of a plurality of preexisting routes based at least in part on the identified location of the unit of work; a manifest generation application that monitors the assignments of each of the units of work and generates the manifest for each of the plurality of preexisting routes; and a portable computing device associated with each of the preexisting routes that receives the manifest for the preexisting route to which the portable computing device is associated.

In another embodiment of the present invention, a system for generating a manifest that lists units of work that are to be completed on one of a plurality of preexisting routes, wherein each of the preexisting routes lists a plurality locations in a geographic area and a predetermined order to be used to service the locations, is described and includes: a data capture system that identifies a plurality of locations where the units of work are to be completed; a work allocation system that assigns each of the units of work to one of a plurality of preexisting routes based at least in part on the identified location of the unit of work; a manifest generation application that monitors the assignments of each of the units of work and generates the manifest for each of the plurality of preexisting routes; and a portable computing device associated with each of the preexisting routes that receives the manifest for the preexisting route to which the portable computing device is associated; wherein further the portable computing device is equipped with a timing device that allows it to track an amount of time remaining before the expiration of a pending time deadline that is associated with one or more of the units of work.

In another embodiment of the present invention, a system for generating a manifest that lists units of work that are to be completed on one of a plurality of preexisting routes, wherein each of the preexisting routes lists a plurality locations in a geographic area and a predetermined order to be used to service the locations, is described and includes: a data capture system that identifies a plurality of locations where the units of work are to be completed; a work allocation system that assigns each of the units of work to one of a plurality of preexisting routes based at least in part on the identified location of the unit of work; a manifest generation application that monitors the assignments of each of the units of work and generates the manifest for each of the plurality of preexisting routes; and a portable computing device associated with each of the preexisting routes that receives the manifest for the preexisting route to which the portable computing device is associated; wherein further the portable computing device is equipped with a timing device that allows it to track an amount of time remaining before the expiration of a pending time deadline that is associated with one or more of the units of work; and wherein further the portable computing device is configured to move a unit of work higher in a predetermined order if one of the units of work is associated with a time deadline and is within a predetermined range of that deadline.

BRIEF DESCRIPTION OF THE DRAWINGS

Figure 1:
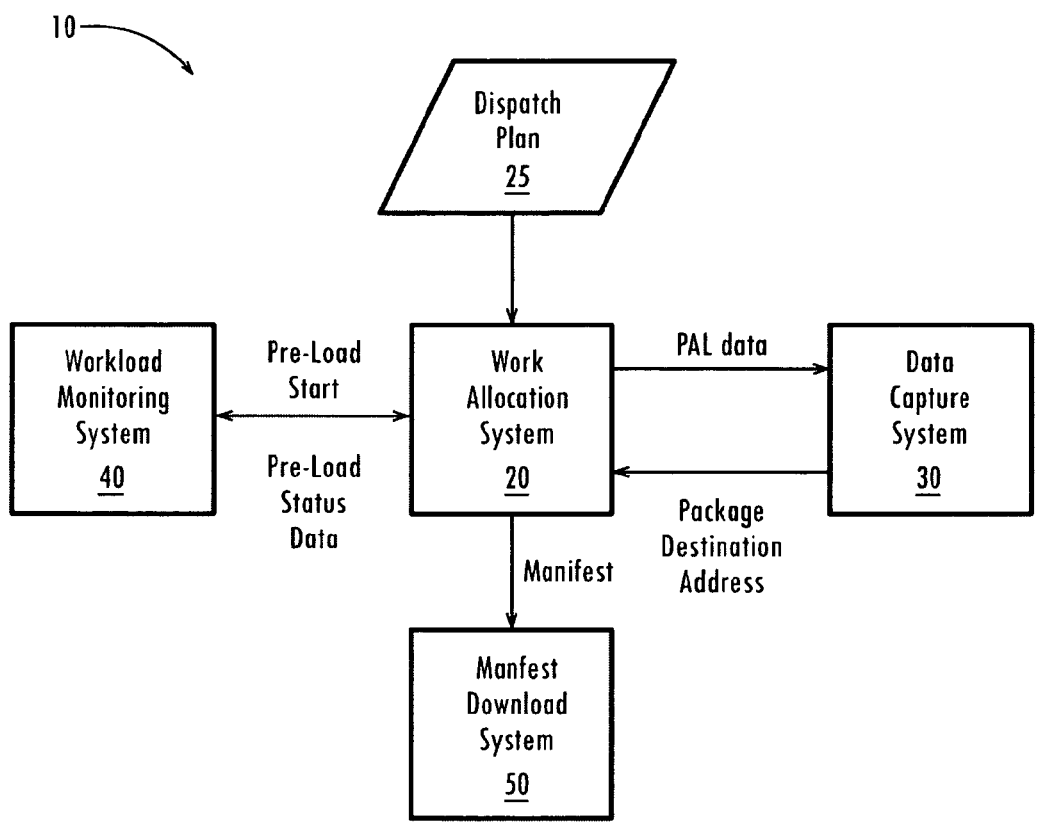

Having thus described the invention in general terms, reference will now be made to the accompanying drawings, which are not necessarily drawn to scale, and wherein:

FIG. 1 illustrates a delivery system in accordance with an embodiment of the present invention.

FIG. 2 shows a pre-load assist label (PAL) that contains a package handling instruction in accordance with an embodiment of the present invention.

Figure 3:
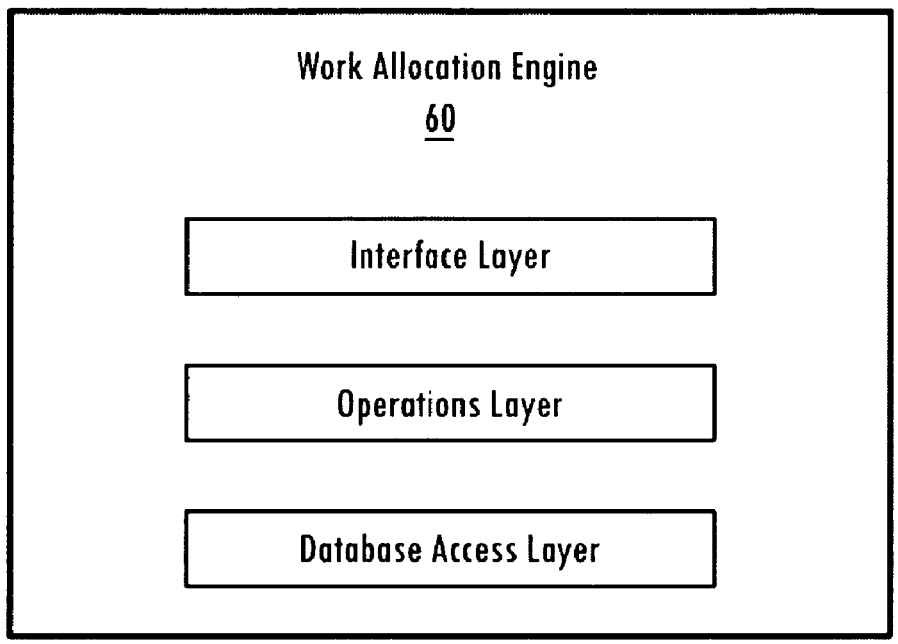

FIG. 3 illustrates an n-tier architecture of a work allocation engine in accordance with an embodiment of the present invention.

Figure 4:
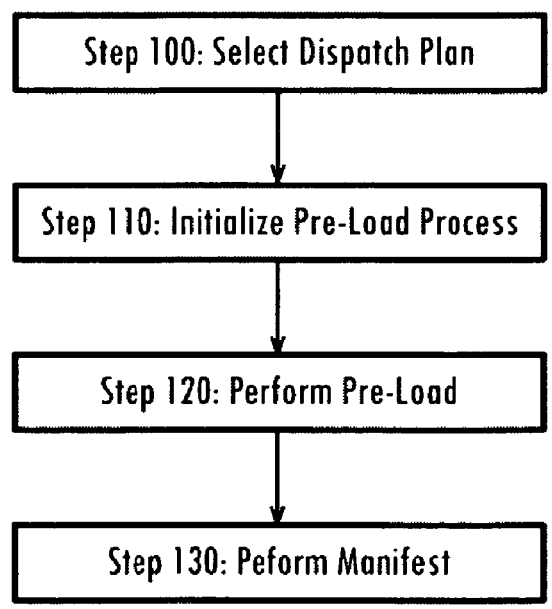

FIG. 4 is a process flow diagram that illustrates the steps of a pre-load process in accordance with an embodiment of the present invention.

Figure 5:
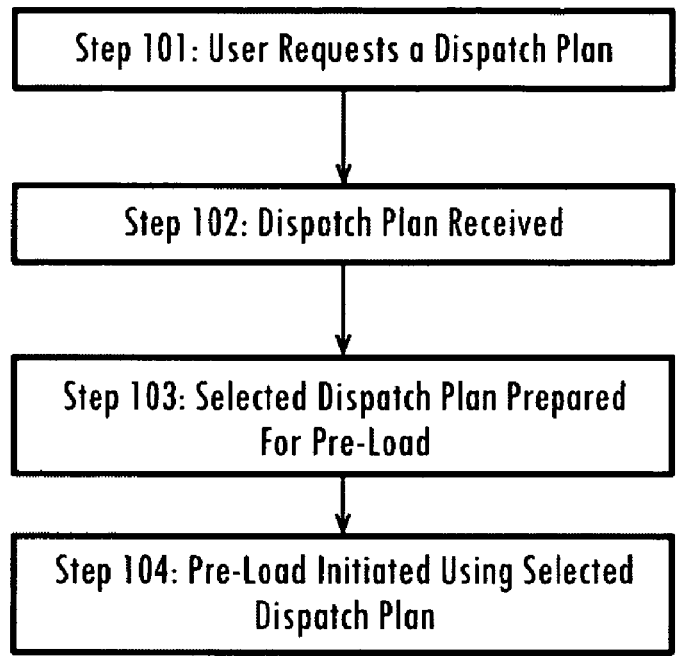

FIG. 5 is a process flow diagram that illustrates the steps of selecting a preexisting dispatch plan in accordance with an embodiment of the present invention.

Figure 6:
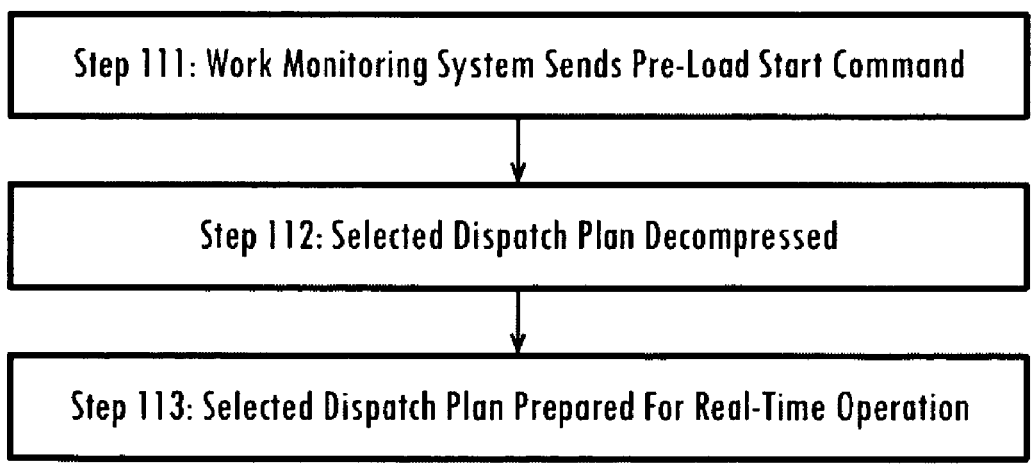

FIG. 6 is a process flow diagram that illustrates the steps of initializing a preexisting dispatch plan and readying the plan for real-time access in accordance with an embodiment of the present invention.

Figure 7:
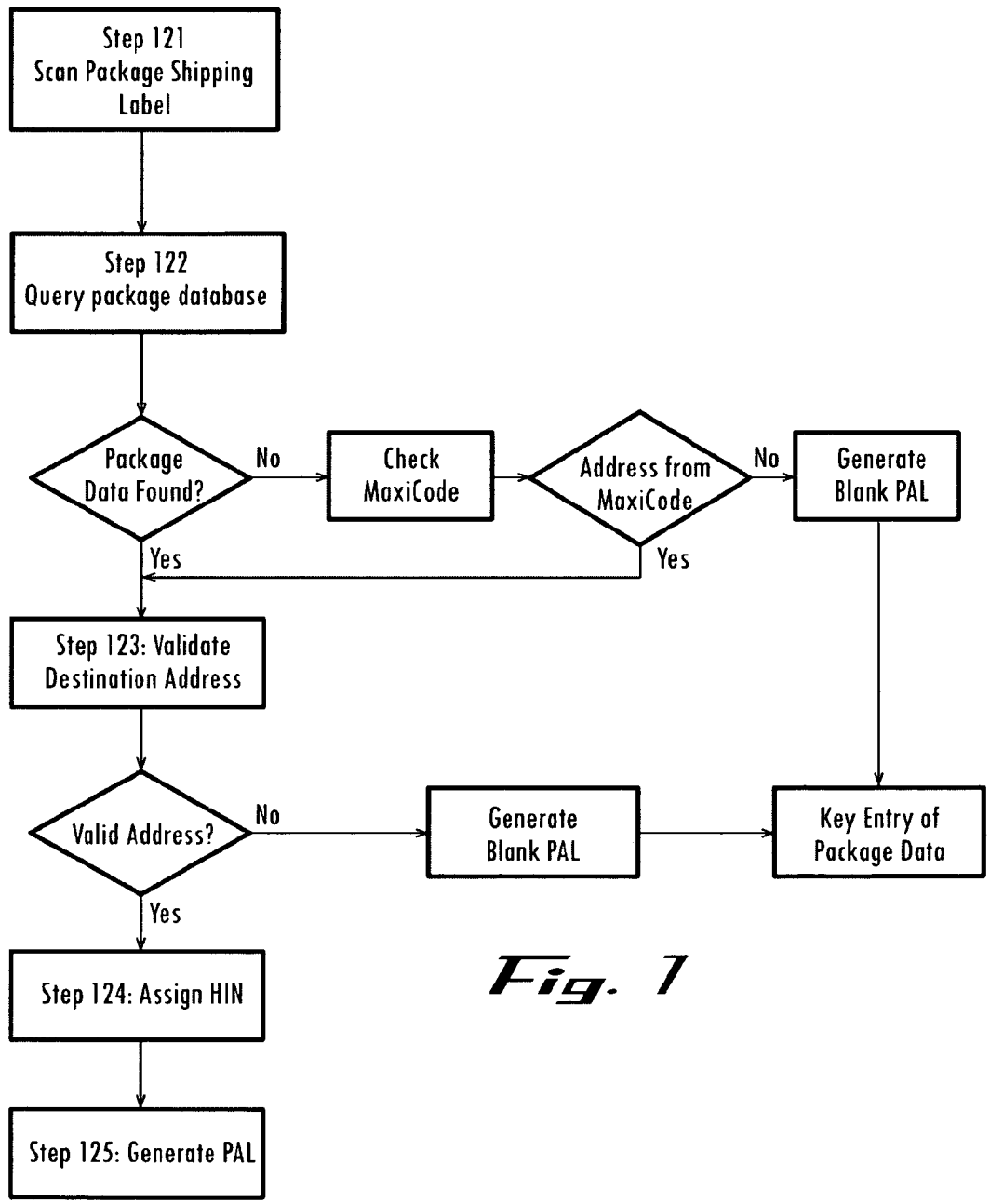

FIG. 7 is a process flow diagram that illustrates the steps of capturing package data and assigning handling instructions to packages in accordance with an embodiment of the present invention.

FIG. 8 shows a PAL with a handling instruction and a blank PAL in accordance with an embodiment of the present invention.

Figure 9:
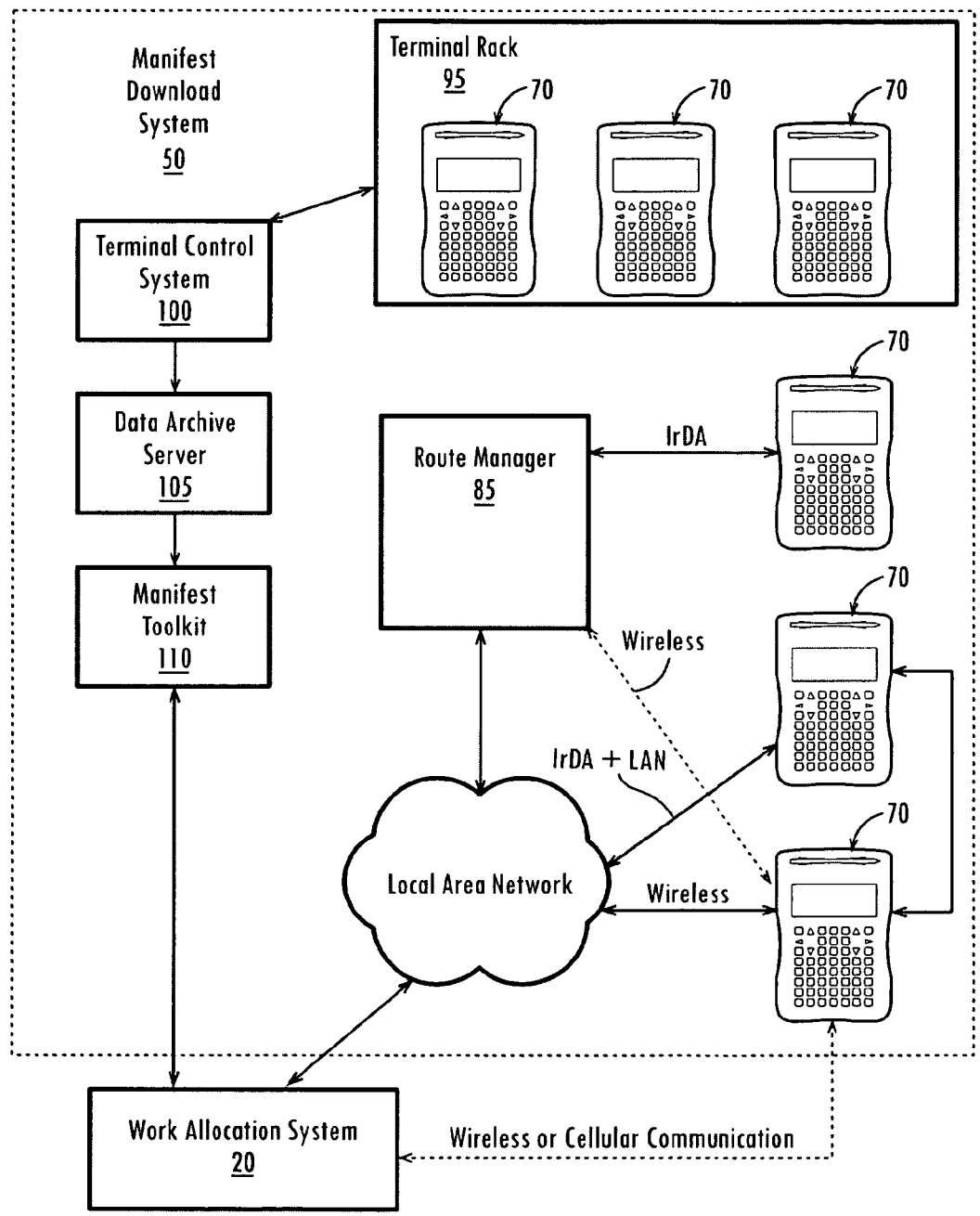

FIG. 9 shows a manifest download system in accordance with an embodiment of the present invention.

Figure 10:
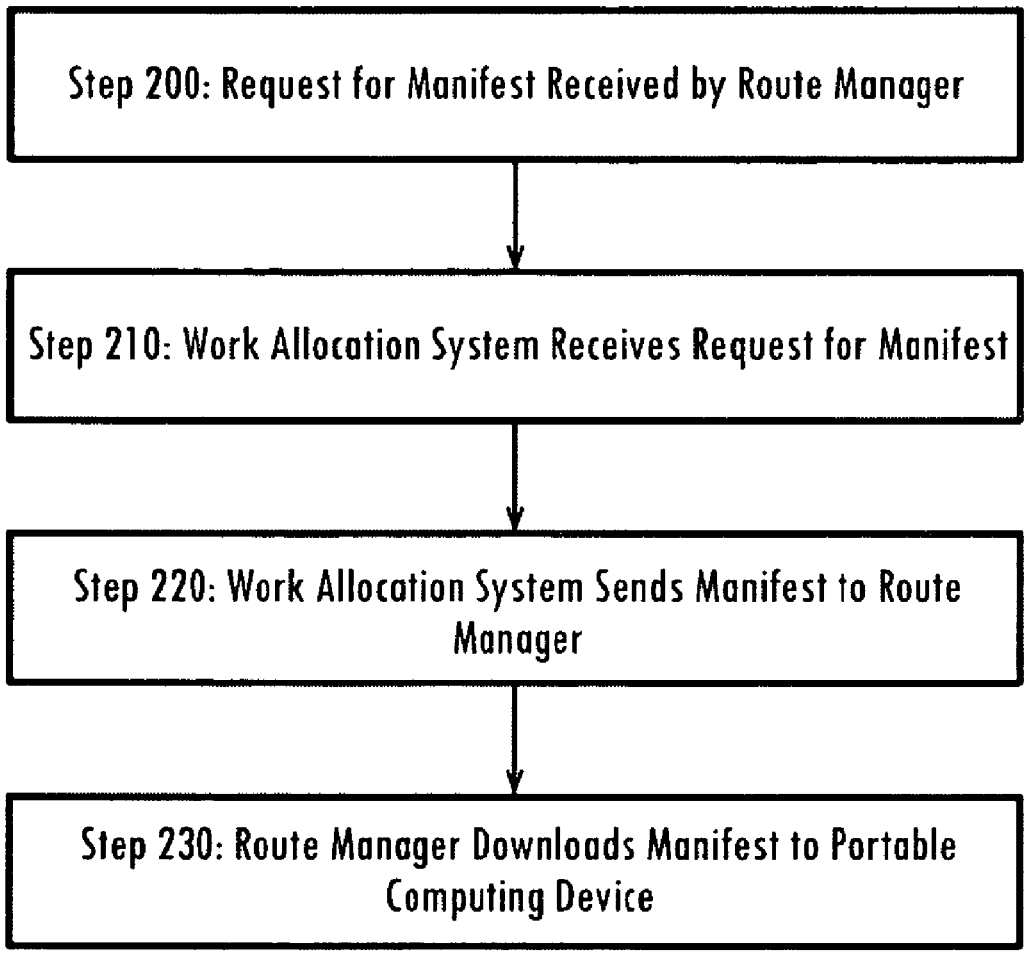

FIG. 10 shows the steps required to download a manifest to a portable computing device in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the system or flowchart blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

A. Pre-Load Process

The following paragraphs describe the present invention in the context of a package delivery system. But one of ordinary skill in the art will recognize that the systems and processes described below have application to delivery and courier systems outside the package delivery industry.

In a package delivery system, the pre-load phase of the delivery process occurs when packages arrive at a carrier destination facility and are loaded to package cars for delivery to the consignee. Groups of individuals, known as pre-loaders, have the responsibility of receiving packages from a sortation bin or conveyor belt, examining the destination address on the package and loading the packages onto the package car that is responsible for delivering to that destination. In a typical destination facility, multiple package cars are loaded simultaneously and every one of the package cars has multiple load positions. As a result, to load a package, the pre-loader must first determine the correct package car for that package and then decide where on that package car to load the package.

These known pre-loading processes are largely manual processes that require that pre-loaders commit to memory the correct package car/load position combination for the many package destinations they encounter each day. Load charts are often placed at the pre-load site to aid the pre-loaders, but the package volume and time restraints of the process require that the pre-loader have an extensive knowledge base of load positions to function effectively.

The complexities associated with the pre-load process require that a pre-loader receive extensive training A pre-loader is often asked to train for six or more weeks to familiarize him or herself with the various load positions they are required to memorize. In addition, because the pre-load process is critical to the timely delivery of packages, additional time must also be spent supervising the work of those fresh out of training. And, notwithstanding this extensive training, the nature of the process is such that errors in pre-loads still occur.

The reliance on the knowledge-base of the pre-loaders to perform the loading process results in other disadvantages as well. One problem is that carriers are unable to change the driver routes for fear of disrupting the pre-load process. The pre-load process relies so heavily on information that pre-loaders have committed to memory that any change to the dispatch plan that changes the loading order can cause major disruptions and errors in the loads. As a result, carriers are hesitant to change a dispatch plan or a route once the pre-loaders have memorized a set of load positions. And because the package car and load position assignments are dependent on the dispatch plan, the driver routes and other dispatch plan variables are rarely changed. Accordingly, drivers are forced to use routes that were developed years earlier, many of which are out of date and no longer efficiently serve a territory has changed in the intervening years.

FIG. 1 shows the various components of a delivery system 10 in accordance with an embodiment of the present invention. In this figure, a work allocation system 20 serves as the central component. The process begins when the work allocation system 20 receives a dispatch plan 25 and uses it to setup a pre-load process. Dispatch plans are well known in the art and can be produced by any number of well-known dispatching applications, among them: Roadnet 5000™, Territory Planner™ and Mobilecast™. For purposes of this invention, a dispatch plan can be viewed as simply a segregation of a geographical area or territory into one or more service provider routes (delivery routes), with each address on a delivery route assigned a service sequence. The systems and methods used to generate dispatch plans are known in the art and are outside the scope of this application. The present invention, instead, is directed generally to the use of a preexisting dispatch plan in a preload and the use of the systems and processes described below to generate and deliver a manifest of work to drivers.

Some of the components illustrated in FIG. 1 include a data capture system 30, a workload monitoring system 40 and a manifest download system 50. The function of each of these components is described in the following paragraphs.

At the start of a pre-load, the work allocation system 20 retrieves a dispatch plan 25 that will be used that day. The dispatch plan 25 is then forwarded to the work monitoring system 40 where a user is given the option of accepting the scheduled dispatch plan 25 or choosing another plan on which to base the pre-load.

As packages arrive in the pre-load site, the data capture system 30 uses a bar code, radio frequency identification (RFID) tag or other known data capture technology to capture the destination addresses and service levels of the packages. The package service level and destination address are passed to the work allocation system 20 where a match is made against the dispatch plan 25 to obtain a handling instruction for the package. As shown below, the handling instruction provides simple to follow instructions for the pre-loaders that indicate where the package should be loaded. The work allocation system 20 then passes the handling instruction information to the data capture system 25 where the information is sent to a printer or other label generation device and a pre-load assist label (PAL 60) is printed and affixed to the package.

FIG. 2 shows a PAL 60 and illustrates how the handling instructions on the PAL 60 instruct a pre-loader where to load the particular package. In the illustrated embodiment, the handling instructions on the PAL 60 comprise two 4-character identifiers separated by a hyphen. The first four characters are used to identify the route or package car, and the second four characters identify a load location on the package car. While a single package car is generally associated with one route, handling instructions can of course be generated that associate multiple routes with a single package car or multiple package cars with a single route.

In a preferred embodiment, the handling instruction provides a simple set of instructions that indicate to a pre-loader where to load the package. Preferably, the handling instructions identify the appropriate package car and the proper load position on the package car for that package. When properly implemented, the generation and use of the handling instructions eliminates the need for the pre-loader to commit load positions to memory. As a result, the pre-loader task is greatly simplified, which in turn offers the carrier or other delivery company greater flexibility in modifying a dispatch plan without risking a disruption to the pre-load process.

With reference again to FIG. 2, the handling instructions on this particular PAL 60 instruct a pre-loader to load the package in position 5889 of route R021. With these handling instructions as a guide, the pre-loader identifies which of the three package cars is assigned to route R021 and places the package on the shelf that is associated with load positions 5000 through 5999. In a preferred embodiment, the load positions assigned to each package car are the same for all package cars. Alternatively, a service provider and/or pre-loader might customize the load position of a package car so that the load position reflected on the PAL 60 identifies load positions on a unique package car or on a unique type of package car.

The PAL 60 can include other package data that is relevant to the sortation and pre-load process. In this example, the PAL 60 includes fields for primary and secondary package sortation information, an irregular drop-off identifier, a DCAP station, a low to high indicator, a commit time, a destination address/consignee name, and a package tracking number. A primary sort identifier identifies the primary sort belt that moves the package through the carrier facility and the secondary sort identifier identifies the secondary belt that moves the package from the primary belt to the belt or bin from which the package is retrieved by the pre-loaders. An irregular drop-off identifier identifies the location in the building where the package will be placed if it is too large, too heavy or shaped such that it cannot be placed on a sorting belt. In general, packages bearing an irregular drop-off identifier are sorted manually.

The DCAP field of the PAL 60 associates the package to a particular data capture workstation in the data capture system 30. The low to high indicator indicates the order in which the package car should be loaded in the package car. In a preferred embodiment, if the low to high indicator is set, packages are loaded sequentially from the lowest number in the street range (i.e. 1 Main Street) to the highest number in the street range (i.e. 10 Main Street). If the low to high indicator is not set, the packages are loaded from the highest number (10 Main Street)

FIG. 3 shows an n-tier architecture of a work allocation engine 60 operating as part of the work allocation system 30 in accordance with an embodiment of the present invention. Microsoft n-tier applications are known in the art and the work allocation engine 60 adopts this well-known architecture. In general, work allocation engine has three layers: an interface layer, an operations layer and a database access layer. The interface layer handles the communication with other applications, including, for example, the work monitoring 40 and data capture systems 30. The operations layer handles the business logic, which in the context of allocating packages to package cars includes the assignment of handling instructions to packages, work measurement counts, alerts when stop counts exceed predetermined thresholds and the validation of add/cut, route creation and route deletion operations. Finally, the database access layer handles the access to one or more databases, including databases for storing dispatch plans, route information and package data. In a preferred embodiment, each of these layers are implemented as Microsoft Transaction Server or Com Plus components.

FIG. 4 is a process flow diagram that illustrates the steps of a pre-load process in accordance with an embodiment of the present invention. The process starts at the beginning of the day when an operator selects one of several preexisting dispatch plans 25 that will be used to perform a pre-load (Step 100).

FIG. 5 is another process flow diagram that further breaks down the process of selecting a dispatch plan 25. In Step 101, a user requests a scheduled dispatch plan. In the illustrated process, the user uses the work monitoring system 40 to select the appropriate dispatch plan 25 for the day. The request is then passed to the work allocation system 20, which, in this embodiment, handles the retrieval of the dispatch plan 25 from a database or other plan data storage device. The retrieval of the dispatch plan 25 occurs in Step 102, and in Step 103 the work allocation system 20 passes the retrieved dispatch plan 25 to the work monitoring system 40. In a preferred embodiment, the user that initiates the pre-load process has access to multiple dispatch plans 25. While one dispatch plan may be scheduled for a given day, the user has the option of overriding the schedule so that he or she can choose another dispatch plan 25 for the pre-load operation. Giving the user the ability to change the dispatch plan and pre-load operation to respond to changes in staffing, weather, traffic patterns or other factors that might affect the delivery process provides a degree of flexibility that is not present in delivery systems known in the art. In a preferred embodiment, the work allocation system 20 also includes a cache of backup dispatch plans 25 that are stored locally and are available for use in the event of a breakdown of the aforementioned process of dispatch plan retrieval.

With reference again to FIG. 4, in Step 110 the work allocation application 20 prepares the selected dispatch plan for the real-time operation of the pre-load process.

FIG. 6 shows a process flow that illustrates the steps of initializing a dispatch plan 25 and readying the plan for real-time access in accordance with an embodiment of the present invention. In Step 111, the work monitoring system 40 sends the appropriate instruction to the work allocation system 20 to initialize the selected dispatch plan 25. In Step 112, the dispatch plan 25 is sent to the work allocation system 20 where it is decompressed for real-time access. In Step 113, the decompressed dispatch plan 25 is organized for real-time access and stored locally in a database in the work allocation system 20.

With reference again to FIG. 4, in Step 120 the dispatch plan 25 has been decompressed and the pre-load operation starts. Packages travel via conveyor belts and/or other sortation devices to the data capture system 30, where the packages are scanned and the destination address and service level of the package is captured. This data is then sent to the work allocation system 20 where the combination of destination address and service level is used to assign the package to a route and load position. The work allocation system 20 then transmits the appropriate handling instruction back to the data capture system 30 where a PAL 60 is generated and affixed to the package.

FIG. 7 shows the process flow of assigning handling instructions to packages. This process is sometimes referred to herein as the scan, print and apply (SPA) process, and includes a process known as exception handling or exception capture. The exception capture process is used when a shipping label or RFID tag of a package cannot be read automatically. In these instances, the package is transferred to a special sortation area where operators attempt to key enter the destination address and service level based on a physical review of the shipping label.

In Step 121, a bar code, RFID or other data storage device associated with a package is read by the data capture system 30 and a package tracking number is captured. In Step 122, the data capture system 30 uses the package tracking number to query a database of package data. In a package delivery system, this database is populated either by electronic information received from the entity that shipped the package or by the carrier using data from an origination scan or paper-work received from the shipper. The package tracking number serves as an index to the database record associated with the package and the destination address and service level are obtained from the information supplied by the shipper.

If the package database has a record related to the package, the process proceeds to Step 123. But if there is no record of the package or if the system 30 cannot capture a package tracking number, a MaxiCode symbol on the package shipping label is scanned. A MaxiCode is a well-known two-dimensional symbology that, depending on whether the MaxiCode is compressed or not, may include a destination address of the package encoded in the symbology. The process proceeds to Step 123, if the system 30 captures a destination address from the MaxiCode. But if the destination address again cannot be electronically captured, the data capture system 30 generates a blank PAL 60.

FIG. 8 shows two PALs 60, including a completed PAL 60 on the top and a blank PAL 60 on the bottom.

The foregoing analysis is primarily described in terms of bar code scanning technology. But one of ordinary skill in the art will recognize that other data capture technology is known in the art and can be used with the present invention. One such example that has been briefly referenced above is RFID technology. RFID technology differs from bar code scanning in that it uses radio waves rather than optics to capture and transmit data. RFID is basically a form of labeling where electronic labels or tags are programmed with unique information and attached to objects to be identified or tracked. In RFID, electronic chips are used to store data that can be broadcast via radio waves to a reader, eliminating the need for a direct line of sight and making it possible for tags to be placed anywhere on or in a package. Additional benefits of RFID are the greater data storage capacity of the RFID tag in comparison to the bar code and a decreased likelihood that the RFID tag will be destroyed or otherwise made unreadable.

A typical RFID system consists of a reader, a tag and a data processing system to process the data read from the tag. The tag also is called a transponder, an expression which is derived from TRANSmitter/resPONDER and, in some cases, the term tag is used for low-frequency (e.g. 125 kHz), whereas the term transponder is used for high-frequency (e.g. 13.56 MHz and 2.45 GHz) tags. But for purposes of this application the terms tag and transponder are used interchangeably. The complexity of the reader (sometimes referred to herein as an interrogator) can vary considerably, depending on the type of tag used and the function to be fulfilled. In general, a reader has radio circuitry to communicate with a tag, a microprocessor to check and decode the data and implement a protocol, a memory to store data and one or more antennas to receive the signal.

Unlike a bar code reader, which is limited to reading a single bar code at a time, a RFID reader may have more than one tag in its interrogation zone. The interrogation zone, as that term is used herein, refers to the area covered by the magnetic field generated by the reader's antenna. The process of reading a number of transponders within a system's interrogation zone is known as batch reading. Software applications known as anticollision algorithms exist that permit a reader to avoid data collision from several tags that enter the interrogation zone at the same time. One of three different anticollision techniques is generally implemented; these techniques are spatial, frequency and time domain procedures.

In the spatial domain technique, the reader restricts its interrogation zone in order to reduce the possibility that two different transponders fall into the area covered by the reader itself. With this technique, the number of readers needed to cover an area increases in proportion to the size of the covered area. Frequency domain procedures are based on frequency domain multiplex techniques or spread spectrum technologies. In these systems, the reader broadcasts a status of frequencies allocated to the communication with the transponders, with frequencies flagged that are currently in use by a transponder. When a new transponder accesses the reader's coverage, it uses an unoccupied frequency to transmit its data.

Time domain anticollision techniques are divided into two categories: interrogator and transponder driven procedures. In addition, interrogator driven time domain anticollision procedures can be sub-divided into polling and binary search procedures. Polling techniques make use of the fact that a unique serial number is written to each transponder at the production stage. In the polling technique, the interrogator requests all possible transponder serial numbers until a transponder with a polled serial number responds. The polling procedure is typically slow and generally is limited to processes employing small numbers of transponders. The other interrogator driven procedure is the binary search. A binary search is faster than the polling technique, and is based on search algorithms that use binary trees of transponder identifiers. In the transponder driven anticollision procedures, the transponder, rather than the interrogator, controls the data flow. In general, transponder driven procedures are based on the cyclic transmission of identifiers by transponders and are designed such that it is unlikely that any two transponders will send the same identifier at the same time.

Thus, in an alternative embodiment of the present invention, the data capture system 30 uses RFID technology to capture the necessary package data. In such an embodiment, packages are equipped with a RFID package tag that may be part of, embedded in or distinct from the package shipping label. Preferably, the RFID package tag has a unique alphanumeric character string (herein referred to as a RFID identifier) that identifies the package. Because RFID technology is being used, packages do not have to be individually placed on a conveyor belt and instead may be grouped together, or even stored in mass in a package container. And because the package tag communicates via a radio signal, the orientation of the package on the conveyor belt is irrelevant. Whereas in a bar code sortation system an operator must manually align the packages onto a conveyor belt in preparation for the scan, in an embodiment where RFID technology is used, package movement to the conveyor is more automated.

In an embodiment in which RFID technology is used, a RFID tag is read by an interrogator and a package RFID identifier is captured. In one embodiment, the RFID identifier has service level and destination address embedded in the RFID data and the process proceeds directly to step 123. Alternatively, the package tracking number may be obtained using RFID technology and used in a query to the package database as described above in connection with a bar code scan.

In the data capture system 30, key entry operators check packages that are headed to the pre-load area and if a package arrives with a blank PAL 60 then the operator manually reviews the shipping label and tries to key-enter a destination address and service level for the package. If the key-entry attempt succeeds, a new PAL 60 is generated and affixed to the package. But if the operator cannot obtain a destination address and service level from the package, the package is marked as an exception and sorted to an exception handling area where additional efforts are made to obtain a valid destination address for the package.

Returning to FIG. 7, in Step 123 the destination address of the package is validated. Processes for validating addresses against a known standard are well-known in the art and details of these processes are outside the scope of this description. Several standards are commonly used by entities that perform deliveries, including a zip+4 standard that is maintained by the United States Postal Service. If the destination address captured by the data capture system 30 is determined to be a valid address, the process proceeds to Step 124 and the address and service level are sent to the work allocation system 20. But if the destination address is not valid, a blank PAL 60 is generated and the package is treated as an exception.

In Step 124, the work allocation system 20 matches the package destination address and service level against the dispatch plan 25 and generates a handling instruction for the package. If the destination address and service level combination do not match the addresses in the dispatch plan 25, a PAL 60 is printed bearing a NIS (not in system) identifier. In a preferred embodiment, pre-loaders manually load packages that bear a NIS identifier on the PAL 60.

In Step 125, the handling instructions are sent from the work allocation system 20 to the data capture system 30, which generates a PAL 60 containing the instructions and affixes (or otherwise associates) the PAL 60 to the package.

Returning again to FIG. 5, once the handling instruction for a package has been determined and a PAL 60 generated and affixed to the package the process moves to Step 130 and the package is manifested. In the context of a package delivery system, the process of manifesting means that the package is added to a particular load manifest. As described below, the loads manifest will ultimately be downloaded via the manifest download system 50 to a portable computing device 70 that a service provider carries on his or her route. The manifest stored in the computing device 70 thus provides the service provider with a clear picture of the work to be completed.

In one embodiment of the present invention, the work allocation system 20 performs the function of assigning packages to a load and generating the manifest. Alternatively, these functions are performed by separate applications and an application, such as a manifest generation application, monitors the assignment of packages and generates the manifest.

The process of downloading the manifest to a portable device 70 is discussed in greater detail below. In general, the work allocation 20 and work monitoring systems 40 track the packages assigned to each load and store the assignments in a data structure referred to herein as a manifest or work manifest. Upon receipt of a request for a manifest download, the work allocation system 20 retrieves the manifest from a database or other storage device where the manifest is stored and transmits the manifest to the application or device that initiated the download request. Either directly from the work monitoring system 20 or indirectly through a route manager (described below), the portable computing device 70 receives the manifest from the work allocation system 20.

If the pre-load has been completed before the manifest is downloaded, then no additional communication is required. But if the manifest is incomplete, a manifest update will occur. In one embodiment, the work monitoring system 40 tracks the progress of the pre-load and is configured to monitor whether a manifest is changed once the manifest has been downloaded. Alternatively, the monitoring of the manifest can occur via one of the work allocation 20 and manifest download systems 50. In still another embodiment, a driver must monitor the pre-load and is required to manually download an updated manifest or at least an update to a preexisting manifest to capture any last minutes changes to his or her workload.

In one embodiment, the download of the manifest and/or the updates to the manifest can occur via direct connection between the portable device 70 and the manifest download system 50. But one of ordinary skill in the art will recognize that the portable device 70 can also be equipped with a wireless radio or cellular technology so that the updates to the manifest can occur after the driver has left the pre-load facility and started his or her route. An advantage to the wireless approach to updating the manifest is the ability to add work to a manifest that is received sometime after the pre-load process has completed. An example of this is a carrier that receives a midday request for a package pickup. If wireless communication is available to the portable computing device 70, a wireless transmission to the portable device 70 can be made to add the new work to the manifest while the driver is in the middle of the route.

B. Manifest Download System

As described above, the manifest of the work assigned to a driver is downloaded to a portable computing device 70 carried by the driver on his or her route. Portable devices of this type are known in the art as evidenced by the delivery information acquisition device (DIAD) unit that UPS drivers have carried since the early 1990's. Since its introduction, UPS drivers have used the DIAD unit to collect package information. In the past, package data would be collected and stored in the DIAD unit while the driver was away from the delivery vehicle servicing their customers. When the driver returned to the vehicle, the DIAD would be placed in a vehicle adapter that facilitated the transmission of the package data to a central storage facility. A package tracking database was then updated with the package data, which allowed customers to track the movement and delivery of their packages in the UPS system. More recent versions of the DIAD unit are equipped with cellular and wireless radios and thereby allow the transmission of package data directly between the DIAD unit and the central storage facility.

A limitation of known delivery systems is an inability to provide a driver with a clear picture of the work that is assigned to the driver on a given day. While existing DIAD units are capable of uploading a list of all known address along a route, the DIAD unit do not indicate which of the addresses are part of the work assigned on a given day. The only way that a driver knows what work has been assigned to him or her is to physically sort through the packages in the storage area of the delivery vehicle.

FIG. 9 illustrates one embodiment of a manifest generation and download system 50 that downloads a manifest of work to a portable computing device 70. This embodiment of the manifest download system 50 includes a plurality of portable computing devices 70, a route manager 85, a terminal rack 95, a terminal control system 100, a data archive server 105 and a manifest tool kit 110. In addition, the manifest download system 50 is in communication with the work allocation system 20 and the other components of the delivery system 10 via the work allocation system 20.

The following paragraphs describe the operation of the manifest download system 50 in accordance with an embodiment of the present invention. As described above, the portable computing devices 70 carried by the drivers are stored in a terminal rack 95 when not in use. While stored in the terminal rack 95, the batteries in the devices 70 are recharged and data is transferred between the portable devices 70 and the other systems. In a preferred embodiment, the terminal control system 100 controls the upload of package data from the portable devices 70 and the download of data to the devices 70. In an embodiment of the present invention, the type of information downloaded to the portable devices 70 while the devices are in the terminal rack 95 include, without limitation, driver profile information (e.g., employee identifier, name, driver type (full-time or helper)), territory data (e.g., information about the planned service territory such as address information), consignee information for a specified territory (e.g., special delivery services, billing information and customer profiles), portable device configuration data (e.g., country, language, currency, supported services and bar code table rules), scheduled pickup account data and/or customized delivery and pickup rules at the shipper and/or consignee level.

In a preferred embodiment, the terminal control system 100 resides on a workstation in a service center and communicates with the portable computing devices 70 via an optical communication interface. But one of ordinary skill in the art however will readily recognize that other communication interfaces may be used instead of the optical interface, including infrared, cellular and/or wireless.

The data archive system 105 communicates with the terminal control system 100 to receive package data as it is downloaded from the portable computing devices 70 at the end of day. Among the package data sent to the data archive system 105 is a disposition on all manifested packages, including data detailing the manifest work that was completed, work completed that was not included in the manifest, and work that was included on the manifest but that was not completed. This work data is then passed from the data archive server 105 to the manifest tool kit 110 where the disposition data is compared against the manifest. This comparison provides an analysis of the accuracy of the manifest data, the decisions made by the driver during the day, and the accuracy of package data received from customers.

A function of the route manager 85 is to serve as an interface between the portable computing devices 70 and the work allocation system 20. FIG. 9 illustrates the route manager 85 communicating with three portable devices 70 via three different communications interfaces. One of ordinary skill in the art will recognize that this figure merely illustrates that the manifest download system 50 can use a variety of known communication interfaces to transmit package and manifest data. In one case, the route manager 85 is shown communicating directly to a portable device 70 via an IrDA or optical port. In a second case, the communication between the route manager 85 and a second portable device 70 occurs via an IrDA device connected to a local area network (LAN). In this example, the portable computing device 70 accesses the LAN using an IrDA device connected to a universal serial bus (USB) port of a personal computer or another IrDA device that is connected to the LAN. The representation in FIG. 9 of the network cloud as a LAN is intended to be illustrative and one of ordinary skill will recognize that other types of networks that are known in the art can be used with the present invention, including, without limitation, a wireless LAN, a wide area network and a wireless wide area network.

In a third case, the communication between the route manager 85 and portable computing device 70 occurs remotely via wireless, cellular, satellite or other known technology for remote data communication between electronic devices. Remote communication between the portable computing device 70 and the route manager 85 can occur either directly or through the LAN. In addition, FIG. 9 also shows the portable device 70 as communicating with the work allocation system 20. This is intended to show that in some embodiments the communication between the manifest generation system 85 and the portable devices 70 can bypass the route manager 85.

Communication between portable computing devices 70 is also shown in FIG. 9. This type of communication between drivers occurs, for example, if work on a first driver manifest is shifted to a second manifest associated with a second driver. A first driver on a first route may have a breakdown of a delivery vehicle and may use the portable computing device 70 to notify a monitoring station or other base of operations of the breakdown. In response, other drivers in the area may receive instructions, either from the monitoring station or from the broken down driver, requesting that they meet at the site of the breakdown to redistribute the work (packages in the case of a package delivery system) that was originally assigned to the driver that broke down. In such case, two drivers may place their respective portable devices 70 in direct contact with one other so that the devices can establish communication via an IrDA or optical port and thereby allow work assigned to a manifest in the first device 70 to be transferred electronically to a manifest in the second device 70.

If the transfer of work between drivers does not require a movement of a package from a first vehicle to a second vehicle, the portable devices 70 may communicate remotely via wireless, cellular or satellite technology. Thus, for example, if a first driver is assigned a pickup and due to traffic or other problems cannot complete the pickup, the driver may transfer the pickup assignment to another driver without requiring that the portable devices 70 be in proximity of one another. These are but a few of the potential situations in which data transfer between portable computing devices 70 is desirable, and other uses for this type of communication will be readily apparent to one of ordinary skill in the art.

The following paragraphs describe the operation of the manifest download system 50 in a package delivery context in accordance with an embodiment of the present invention.

At the start of the day, a driver retrieves a portable computing device 70 from terminal rack 95. In an embodiment, a partial manifest is downloaded to the portable device 70 via the terminal control system 100 while the device 70 is stored in the terminal rack 95. The pre-load process continues even after the driver removes the portable device 70 from the terminal rack 95; therefore, just before leaving to start the route, the driver points the portable device 70 to an IrDA port of the route manager 85 to capture the changes that occurred since the last manifest update.

FIG. 10 shows a process flow to download a manifest to a portable computing device 70 in accordance with an embodiment of the present invention. In Step 200, the route manager 85 receives a request from a portable computing device 70 for a manifest and forwards the request to the work allocation system 20. In Step 210, the work allocation system 20 retrieves the requested manifest from a database or other device used to store manifest data. In Step 220, the work allocation system 20 transmits the manifest to the route manager 85. And in Step 230, the route manager 85 downloads the manifest to the portable computing device 70.

In a typical scenario, a driver has the option to re-download and/or update the manifest data as often as necessary. In our example above, if an add/cut is performed after the driver has already downloaded the manifest, he or she can reconnect the portable computing device 70 to the route manager 85 to capture change. Alternatively, (and as shown below) the driver may use the portable computing device 70 to request additional manifest updates after the driver has left the pre-load site.

To continue with the above example, the driver obtains the most up-to-date version of the manifest and leaves the pre-load site to begin his or her route. Later that day, the carrier receives an emergency request from a customer requesting a package pickup. The address and service level of the new work is entered into a work allocation system 20 (or some other system that is responsible for the distribution of new work) which matches the new work against the preexisting dispatch plan to select the driver that will receive the assignment. The carrier then establishes a communications link (via wireless, cellular, satellite or other known remote data transfer technology) with the portable computing device 70 associated with the selected driver and updates his or her manifest with the new assignment.

In a preferred embodiment, the portable computing device 70 is configured to use the manifest data to perform several functions, including work transfers, determine next activity and the perform activity function. The work transfer function (described above) is generally used to transfer work from one portable computing device 70 to another.

The next activity function allows a driver to view the next activity to be performed in the manifest. In delivery systems that are known in the art, a driver is continuously moving in and out of the storage area of the package car, constantly reviewing the work that remains to be completed. A driver's failure to keep a close eye on the remaining work often results in a missed commit time or the need to backtrack along the route to deliver a package that was missed. The determine next activity function addresses this planning problem by tracking the manifested work and presenting the driver with an ordered plan to complete the work.

In a preferred embodiment, a driver has the ability to view the manifest in a variety of ways. The following paragraphs describe various views that are available to a driver. In one embodiment, a default view of the manifest is to list the work in the sequence that the work is to be completed in accordance with the dispatch plan that is used to assign the work. This view is valuable in that it presents a driver with an ordered listing of the work assignments for a day and driver can determine with a glance the next work assignment to be completed. An alternative view that is available to the driver is a listing of those units of work that have a time deadline or commit time by which the work must be completed. Still another view that is available to a driver is a view of all work associated with a particular location. This is useful in cases where a driver is delivering to more than one customer at a single address (or address range) such as a shopping mall or office building. A benefit of having the manifest on the portable computing device 70 is that a driver can display a list of every unit of work associated with a given location with a few keystrokes.

Two other views of the manifest that is available to drivers are the whole view and a commit time view. When the whole view is used, the manifest is organized by commit and delivery order listing (DOL). DOL organizes work based on the sequence established by the dispatch plan without regard to premium service levels. The commit time takes into account that work with a premium service level must be completed on or before established commit times. The whole view of the manifest defaults to the DOL view of the manifest; however, work that has a commit time gains priority in the manifest list as the commit time approaches. In other words, the manifest display increases the priority of commit time work to notify the service provider that a commit time is approaching and the service provider needs to start considering the work for a future delivery.

In a preferred embodiment, the determine next activity function of the portable computing device 70 controls the manner in which the manifest is organized in the display. As a particular commit time approaches, the work that must be completed by the approaching time deadline receives a higher priority in the list of work. In one embodiment, if multiple packages have the same commit time, the units of work associated with that common time deadline are sorted by DOL.

In one embodiment, the determine next activity function estimates the location of the driver based upon the work already performed and lists the commit time work that remains to be completed such that the work that is nearest to the driver's estimated position is listed first. Alternatively, the portable computing device 70 is equipped with a global positioning system (GPS) and the actual location of the driver is used rather than an estimate of the driver's location.

A driver also has the option of using a commit time view. The commit time view lists only that work on the manifest that has a commit time and, in a preferred embodiment, the work is organized first by commit time and then by DOL. In alternative embodiments, the commit time work is organized first by commit time and then by the work that is closest to the driver's current location, which is either estimated based on work performed or determined by a GPS device.

Another benefit of having manifest data in the portable computing device 70 is the perform activity function. In the context of a package delivery system, a driver uses the perform activity function when the driver delivers or picks up a package. In a preferred embodiment, the manifest of work includes information about the work to be performed and the customer for whom the work is performed. In the context of a delivery of a package, for example, the manifest includes the name and address of the consignee of the package, information about the package to be delivered and information about the shipper that shipped the package. When a driver arrives at the customer site to deliver the package, some or all of the relevant information for the delivery of the package is already present in the portable computing device 70 in the manifest. The perform activity function uses the delivery information in the manifest to pre-populate the fields on the portable device 70. This saves the driver from having to key enter the name of the package recipient and eliminates the keystroke errors that result from manual entry. In a preferred embodiment, the perform activity function also notifies the driver if the number of packages delivered does not match the number manifested, and, in this way, the perform activity function serves as an audit to double check the delivery activity.

A typical package delivery performed by a driver with a downloaded into his or her portable computing device 70 will typically occur as follows. The driver arrives at the site and refers to the manifest to determine which packages are to be delivered. The driver uses a bar code scanner, RFID interrogator or similar technology to capture a tracking number or other package identifier from the shipping labels of the packages that are to be delivered. The portable computing device 70 compares the captured package data to the manifest to confirm that the appropriate package is being delivered and pre-populates the delivery display with the relevant customer and package information. In a preferred embodiment, the perform activity function also provides the driver with accessorial data for the stop, such as whether an adult signature is required or whether the work is a cash-on-delivery transaction.

When the delivery is completed, the work disappears from the manifest display. At the end of the day the manifest is cleared and the driver returns the portable computing device 70 to the terminal rack 95. Disposition information collected throughout the day is then uploaded to the terminal control system 100 and is passed to the data archive server 105 and the manifest tool kit 110. The manifest tool kit 110 compares the disposition data against the manifest and provides reports or other feedback as to the accuracy of the data on the original manifest, the decisions made by the driver and the accuracy of information received from the customers.

The delivery system 10, which comprises an ordered listing of selectable services can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Further, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

That which is claimed:

1. A system for generating a manifest of work in a package delivery system, the system comprising:

(A) a work allocation system comprising a device configured to assign one or more of a plurality of packages that are destined for a designated geographic location, to one of a plurality of preexisting delivery routes based at least in part on shipping label data of the packages;
wherein:
the device is further configured to:
monitor the assigned packages and to generate a manifest of work for each of the plurality of preexisting delivery routes; and
generate the manifest to comprise one or more assignments in a predetermined order, wherein at least one of the assignments is associated with a time for completing delivery of at least one of the packages; and
(B) a portable computing device that is configured to:
receive the manifest of work in an electronic format;
facilitate display of the assignments in the predetermined order, the order comprising a sequential order in which the assignments are to be completed;
receive one or more updates to the electronic manifest from the device;
revise the electronic manifest by adding or removing at least one assignment corresponding to delivery of one of the packages based on at least one of the updates received; and
reposition the at least one assignment higher in the displayed predetermined order signifying an increased priority in response to determining a current time that is within a predetermined time period of the time for completing delivery.

2. The system of claim 1, wherein:
the shipping label data is captured by a second device of a data capture system, the shipping label data comprises at least one package destination address and at least one service level.

3. The system of claim 2, wherein the device is configured to assign packages based at least in part on the package destination address and the service level.

4. The system of claim 3, wherein the device is configured to assign the packages to the routes by comparing the destination address and the service level against a dispatch plan.

5. The system of claim 1, wherein the device is configured to generate the manifest of work to comprise a list of locations and a sequence of servicing the locations.

6. The system of claim 5, wherein the device is configured to generate the sequence of servicing based on a dispatch plan.

7. The system of claim 5, wherein the portable computing device is configured to display the manifest of work in accordance with the sequence of servicing.

8. The system of claim 1, wherein the portable computing device is configured to receive the at least one update after the portable computing device leaves a pre-load facility.

9. The system of claim 1, wherein the portable computing device is configured to electronically transfer the work assigned to the manifest to a second manifest on a second portable computing device.

10. The system of claim 1 wherein:
the device is configured to associate each assignment with a delivery location; and
the portable computing device comprises a global positioning system (GPS) device configured to determine a current location of the portable computing device and the portable computing device is further configured to:
reposition the at least one assignment higher in the displayed predetermined order signifying an increased priority in response to detecting that the current location is within a predetermined distance from a delivery location associated with at least one of the assignments.

11. The system of claim 1, wherein:
the device is further configured to associate each of the one or more assignments with one or more corresponding delivery locations;
the portable computing device is further configured to:
estimate a current location of the portable computing device based at least in part on completion of at least one assignment;
determine a delivery location, among the delivery locations, that is nearest to the current location; and
reposition an assignment higher in the displayed predetermined order signifying an increased priority in response to detecting that the determined delivery location corresponds to the assignment.

12. A method for generating a manifest of work in a package delivery system, the method comprising:
at a first device of a work allocation system:
assigning one or more of a plurality of packages that are destined for a designated geographic location, to one of a plurality of preexisting delivery routes based at least in part on shipping label data of the packages;
monitoring the assigned packages and generating a manifest of work for each of the plurality of preexisting delivery routes,
wherein the manifest comprises one or more assignments in a predetermined order, and at least one of the assignments is associated with a time for completing delivery of at least one of the packages; and
at a portable computing device:
receiving the manifest of work in an electronic format;
facilitating display of the assignments in the predetermined order, the order comprising a sequential order in which the assignments are to be completed;
receiving one or more updates to the electronic manifest from the first device;
revising the electronic manifest by adding or removing at least one assignment corresponding to delivery of one of the packages based on at least one of the updates received; and
repositioning, via a processor of the portable computing device, the at least one assignment higher in the displayed predetermined order signifying an increased priority in response to determining a current time that is within a predetermined time period of the time for completing delivery.

13. The method of claim 12, wherein:
the shipping label data is captured by a second device of a data capture system, the shipping label data comprises at least one package destination address and at least one service level.

14. The method of claim 13, wherein assigning the packages further comprises assigning packages based at least in part on the package destination address and the service level.

15. The method of claim 13, wherein assigning further comprises assigning the packages to the routes by comparing the destination address and the service level against a dispatch plan.

16. The method of claim 12, further comprising, generating, via the first device, the manifest of work to comprise a list of locations and a sequence of servicing the locations.

17. The method of claim 16, further comprising generating, via the first device, the sequence of servicing based on a dispatch plan.

18. The method of claim 16, further comprising facilitating display, via the portable computing device, of the manifest of work in accordance with the sequence of servicing.

19. The method of claim 12, further comprising receiving, via the portable computing device, the at least one update after the portable computing device leaves a pre-load facility.

20. The method of claim 12, further comprising electronically transferring, via the portable computing device, the work assigned to the manifest to a second manifest on a second portable computing device.

21. The method of claim 12, further comprising:
associating, via the first device, each assignment with a delivery location;
determining, via a global positioning system (GPS) of the portable computing device, a current location of the portable computing device; and
repositioning, via the portable computing device, the at least one assignment higher in the displayed predetermined order signifying an increased priority in response to detecting that the current location is within a predetermined distance from a delivery location associated with at least one of the assignments.

22. The method of claim 12, further comprising:
associating, via the first device, each of the one or more assignments with one or more corresponding delivery locations;
estimating, via the portable computing device, a current location of the portable computing device based at least in part on completion of at least one assignment;
determining, via the portable computing device, a delivery location, among the delivery locations, that is nearest to the current location; and
repositioning, via the portable computing device, an assignment higher in the displayed predetermined order signifying an increased priority in response to detecting that the determined delivery location corresponds to the assignment.

23. A computer program product for generating a manifest of work in a package delivery system, the computer program product comprises at least one computer-readable storage medium having computer-readable program code portions stored therein, the computer-readable program code portions comprising:
program code instructions configured to assign one or more of a plurality of packages that are destined for a designated geographic location, to one of a plurality of preexisting delivery routes based at least in part on shipping label data of the packages;
program code instructions configured to monitor the assigned packages and generate a manifest of work for each of the plurality of preexisting delivery routes;
program code instructions configured to generate the manifest to comprise one or more assignments in a predetermined order, wherein at least one of the assignments is associated with a time for completing delivery of at least one of the packages;
program code instructions configured to enable receipt of the manifest of work in an electronic format;
program code instructions configured to facilitate display of the assignments in the predetermined order, the order comprising a sequential order in which the assignments are to be completed;
program code instructions configured to enable receipt of one or more updates to the electronic manifest from a first device;
program code instructions configured to revise the electronic manifest by adding or removing at least one assignment corresponding to delivery of one of the packages based on at least one of the updates received; and program code instructions configured to reposition the at least one assignment higher in the displayed predetermined order signifying an increased priority in response to determining a current time that is within a predetermined time period of the time for completing delivery.

24. The computer program product of claim 23, further comprising:

program code instructions configured to associate each assignment with a delivery location;

program code instructions configured to determine a current location of a portable computing device, via a global positioning system (GPS) of the portable computing device; and program code instructions configured to reposition the at least one assignment higher in the displayed predetermined order signifying an increased priority in response to detecting that the current location is within a predetermined distance from a delivery location associated with at least one of the assignments.

25. The computer program product of claim 23, further comprising:

program code instructions configured to associate each of the one or more assignments with one or more corresponding delivery locations;

program code instructions configured to estimate a current location of a portable computing device based at least in part on completion of at least one assignment;

program code instructions configured to determine a delivery location, among the delivery locations, that is nearest to the current location; and program code instructions configured to reposition an assignment higher in the displayed predetermined order signifying an increased priority in response to detecting that the determined delivery location corresponds to the assignment.

* * * * *